US008850153B2

(12) United States Patent
Tressler et al.

(10) Patent No.: US 8,850,153 B2
(45) Date of Patent: Sep. 30, 2014

(54) ENABLING THROTTLING ON AVERAGE WRITE THROUGHPUT FOR SOLID STATE STORAGE DEVICES

(75) Inventors: Gary A. Tressler, Sandy Hook, CT (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 13/250,416

(22) Filed: Sep. 30, 2011

(65) Prior Publication Data
US 2013/0086302 A1 Apr. 4, 2013

(51) Int. Cl.
G06F 12/00 (2006.01)
G06F 3/06 (2006.01)
G06F 12/02 (2006.01)

(52) U.S. Cl.
CPC .......... *G06F 12/0246* (2013.01); *G06F 3/0613* (2013.01); *G06F 3/0659* (2013.01); *G06F 3/0679* (2013.01)
USPC .................... 711/167; 711/103; 711/E12.008

(58) Field of Classification Search
USPC .................................. 711/103, 167, E12.008
See application file for complete search history.

(56) References Cited

U.S. PATENT DOCUMENTS

| 7,721,043 | B2 | 5/2010 | Gill et al. | |
|---|---|---|---|---|
| 8,539,139 | B1 * | 9/2013 | Morris | 711/103 |
| 2005/0071550 | A1 | 3/2005 | Lowe et al. | |
| 2006/0224825 | A1 | 10/2006 | Mogi et al. | |
| 2007/0050684 | A1 | 3/2007 | Takaoka et al. | |
| 2008/0126724 | A1 | 5/2008 | Danilak | |
| 2009/0198874 | A1 | 8/2009 | Tzeng | |
| 2011/0004722 | A1 | 1/2011 | Jeddeloh | |
| 2011/0010514 | A1 | 1/2011 | Benhase et al. | |
| 2011/0099320 | A1 | 4/2011 | Lucas et al. | |
| 2012/0047320 | A1 | 2/2012 | Yoo et al. | |

FOREIGN PATENT DOCUMENTS

| CN | 1375771 A | 10/2002 |
|---|---|---|
| CN | 1968187 A | 5/2007 |
| WO | WO2009047855 A1 | 4/2009 |

OTHER PUBLICATIONS

Bisson, Timothy et al., "A Hybrid Disk-Aware Spin-Down Algorithm with I/O Subsystem Support", IEEE, IPCCC'07, downloaded Jun. 24, 2010, pp. 236-245.
Combined Search and Examination Report, dated Dec. 21, 2012, Application No. GB1215925.7, 5 pages.
U.S. Appl. No. 13/826,386, filed Mar. 14, 2013, 1 page.

* cited by examiner

*Primary Examiner* — Yong Choe
(74) *Attorney, Agent, or Firm* — Stephen R. Tkacs; Stephen J. Walder, Jr.; Randall J. Bluestone

(57) ABSTRACT

A mechanism is provided for enabling throttling on average write throughput instead of peak write throughput for solid-state storage devices. The mechanism assures an average write throughput within a range but allows excursions of high throughput with periods of low throughput offsetting against those of heavy usage. The mechanism periodically determines average throughput and determines whether average throughput exceeds a high throughput threshold for a certain amount of time without being offset by periods of low throughput.

22 Claims, 2 Drawing Sheets

US 8,850,153 B2

ENABLING THROTTLING ON AVERAGE WRITE THROUGHPUT FOR SOLID STATE STORAGE DEVICES

BACKGROUND

The present application relates generally to an improved data processing apparatus and method and more specifically to mechanisms for enabling throttling on average write throughput instead of peak write throughput for solid-state storage devices.

A solid-state drive (SSD) is a data storage device that uses solid-state memory to store persistent data with the intention of providing access in the same manner of a traditional block I/O hard disk drive. SSDs are distinguished from traditional hard disk drives (HDDs), which are electromechanical devices containing spinning disks and movable read/write heads, SSDs, in contrast, use microchips which retain data in non-volatile memory chips and contain no moving parts. Compared to electromechanical HDDs, SSDs are typically less susceptible to physical shock, are quieter, and have lower access time and latency. SSDs use the same interface as hard disk drives, thus easily replacing them in most applications.

Lower priced SSDs usually use multi-level cell (MIX) flash memory, which is slower and less reliable than single-level cell (SLC) flash memory. This can be mitigated or even reversed by the internal design structure of the SSD, such as interleaving, changes to writing algorithms, and higher over-provisioning (more excess capacity) with which the wear-leveling algorithms can work. The ability to use MLC and preferably consumer grade MLC is very important to getting the cost of SSDs down to increase their adoption rate in enterprise applications.

However, MLC devices, or any solid-state memory devices, have severe restrictions on write endurance. More specifically, high rates of write throughput, if sustained for long enough, can cause the SSD to start experiencing bad blocks beyond what it can endure. SSDs are most effective in helping system performance for random operations; therefore, they certainly must be able to accept high write throughputs at times.

In order to ensure enough life, some SSDs apply wear-leveling by throttling performance by not allowing the device to go above a certain absolute maximum. This has the disadvantage of not allowing short excursions to get the data into the SSD so that the operations per second can then be increased. Such throttling can also dramatically increase latency or response time which can trigger cascading events like storage write caches filling up and host buffers filling up resulting in very-large latencies as seen by the host.

SUMMARY

In one illustrative embodiment, a method, in a data processing system, is provided for throttling a solid-state storage device on average write throughput. The method comprises for each given period of time, determining average write throughput to a solid-state storage device over the given period of time. The method further comprises determining a first amount of time that average write throughput is high and determining a second amount of time that average write throughput is low. The method further comprises throttling write throughput to the solid-state storage device based on a comparison of the first amount of time and the second amount of time.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a solid-state storage device is provided. The solid-state storage device may comprise a controller and a solid-state memory coupled to the controller. The controller may be configured to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
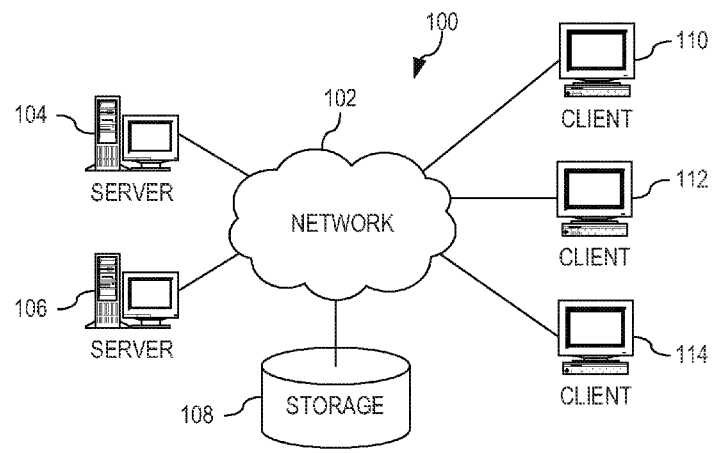
FIG. 1 depicts a pictorial representation of an example distributed data processing system in which aspects of the illustrative embodiments may be implemented.

The illustrative embodiments provide a mechanism for enabling throttling on average write throughput instead of peak write throughput for solid state storage devices. The method attempts to allow spikes in write throughput so normal workload variations will not be capped at levels less than what could otherwise be sustained. The mechanism assures an average write throughput within a range but allows excursions of high throughput with periods of low throughput offsetting against those of heavy usage.

Throughput for purposes of this disclosure is the rate at which data is written to the actual flash devices within the SSDs. In other words, every attempt should be made by the solid state storage to take into account actual data written to the flash since that is what results in write endurance issues. For example, if the host writes 4K bytes that are unaligned to the SSDs flash pages and the result is a read of both pages and an update to both and then 8K being written to flash, the throughput calculation should take into account 8K not 4K as done by the host. Writes of parity information on the drive for a RAID code over NAND flash devices and garbage collection should be taken into account if possible when setting both the throughput thresholds and the measured throughput. A host writing 40 MB/sec of sequential large block writes may not need throttling at all where as a system doing 30 MB/sec of random unaligned 8K blocks may need throttling since that is the equivalent of 60 MB/sec or more depending on many things to the flash devices.

The mechanism initializes a time register to keep track of the net time above or below a pair of thresholds, which are set so the mechanism can set or remove throttling. Each time the solid-state drive (SSD) is powered up, the mechanism starts a period counter. It may even be necessary to save such information across power down events if these occur regularly. Responsive to the period counter indicating that a predetermined period of time has expired, the mechanism determines whether the average throughput of the SSD for the predetermined period of time is greater than a high throughput threshold or lower than a low throughput threshold. If the average throughput is greater than the high throughput threshold, the mechanism increments the time register, and if the average throughput is less than the low throughput threshold, the mechanism decrements the time register. If the time register exceeds a high throttling threshold, the mechanism sets throttling for the SSD. If the time register falls to or below a low throttling threshold, the mechanism removes throttling.

This represents the simplest approach to throttling where the result is simply above or below. In accordance with an example embodiment, the mechanism may add precision by adding tiers to this approach by determining if the average was p above or q below, where p and q represent the next tier values up or down from the throughput threshold. For example, if the throughput threshold is 50 MB/sec, then greater than 50 and less than 60 would increment by 1, where as greater than 60 but less than 70 would increment by 2, and so forth.

Figure 2:
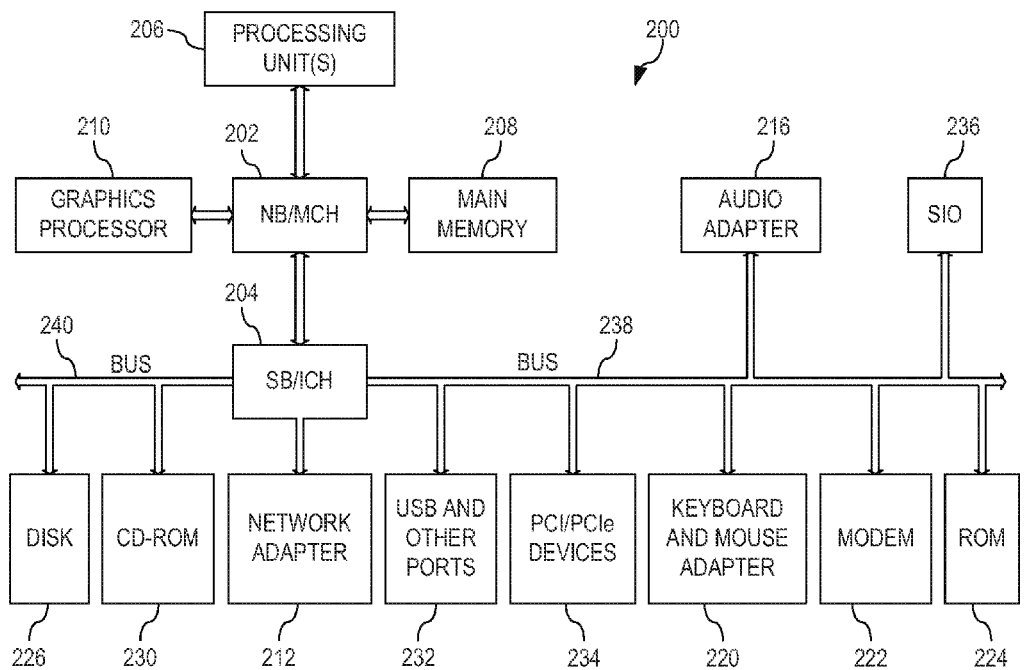
FIG. 2 is a block diagram of an example data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
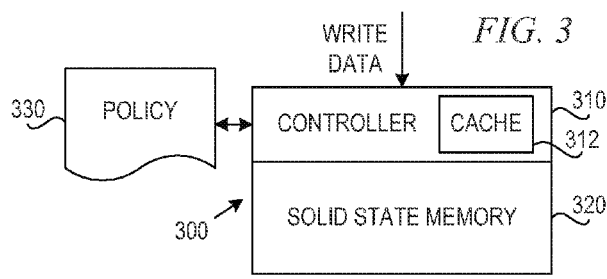
FIG. 3 is a block diagram illustrating a solid-state drive in which aspects of the illustrative embodiments may be implemented.

FIG. 3 is a block diagram illustrating a solid-state drive in which aspects of the illustrative embodiments may be implemented. Solid-state drive 300 may be used in addition to or in place of hard disk drives. For example, solid-state drive 300 may be embodied within storage 108 in FIG. 1 or in place of disk 226 in FIG. 2. Solid-state drive 300 comprises a controller 310 and solid-state memory 320. Controller 310 has a cache 312, which may be volatile memory, such as dynamic random access memory (DRAM), Solid-state memory 320 may comprise one or more banks of non-volatile NAND flash memory, for example. Solid-state memory 320 may be single-level cell (SLC) or multi-level cell (MLC) flash memory.

Controller 310 caches read and write data in cache 312 and persists writes to solid-state memory 320. Controller 310 may apply wear-leveling by throttling performance. More particularly, in accordance with an illustrative embodiment, controller 310 assures an average write throughput within a range but allows excursions of high throughput with periods of low throughput offsetting against those of heavy usage. Controller 310 periodically determines average throughput and determines whether average throughput exceeds a high throughput threshold for a certain amount of time without being offset by periods of low throughput. Controller 310 includes data written to solid state memory 320 in the average throughput determinations, including metadata, but does not include data written to cache 312.

Solid-state drive 300 includes policy 330, which stores user policies for policy based throttling, such as dynamic throttling or user configurable throttling. Controller 310 may read policy 330 and may set or dynamically adjust thresholds based on policy 330 as will be described in further detail below.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
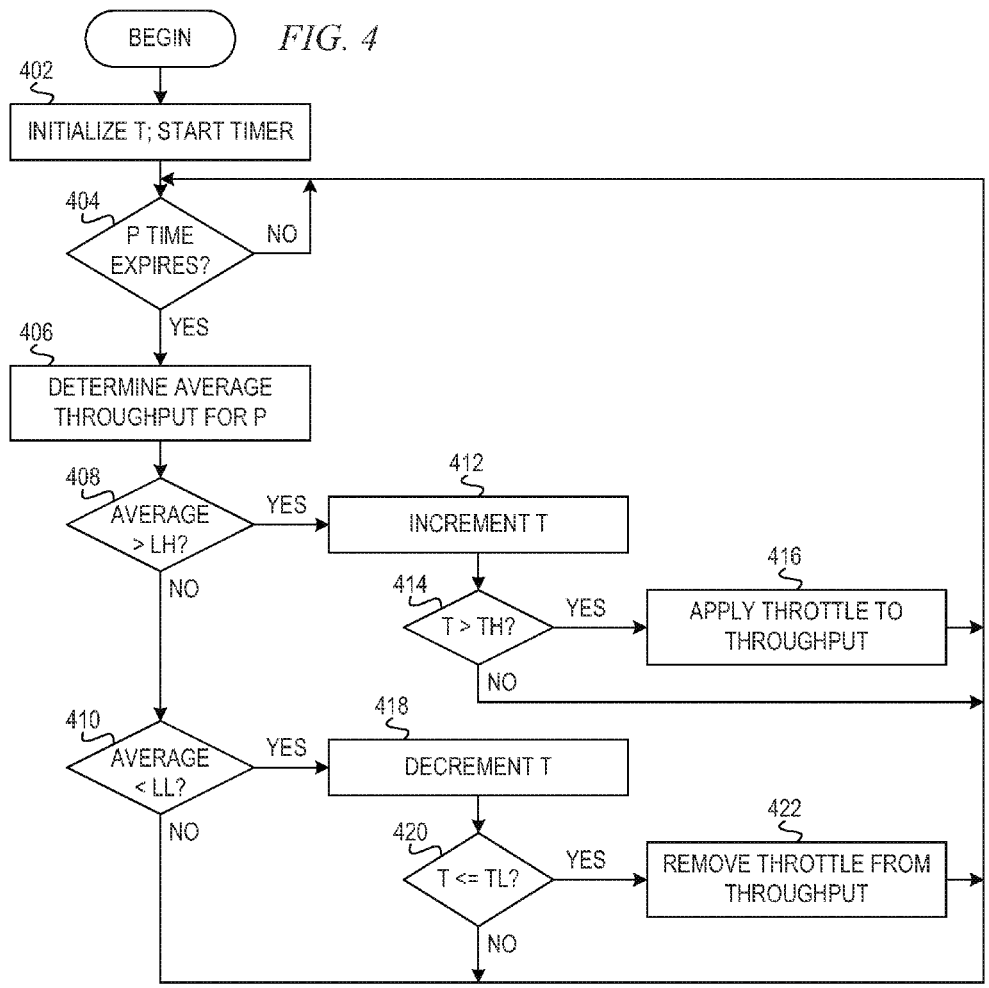
FIG. 4 is a flowchart illustrating operation of a mechanism for enabling throttling on average write throughput instead of peak write throughput for solid-state storage devices in accordance with an illustrative embodiment.

FIG. 4 is a flowchart illustrating operation of a mechanism for enabling throttling on average write throughput instead of peak write throughput for solid-state storage devices in accordance with an illustrative embodiment. The flowchart uses the following terms:

LH: high throughput threshold. This threshold may be in MB/sec, e.g., 110 MB/sec. The high throughput threshold may be some range above the worst case average threshold to be maintained, e.g., 10% above or 1 sigma, if a distribution of write rates is available. There may also be levels of LH like LH1, LH2, LH3, each of which increments by 1, 2 or 3, for example, depending on the tier of the threshold.

LL: low throughput threshold. This threshold may be in MB/sec, e.g., 90 MB/sec. The low throughput threshold may be some range below the worst case average threshold to be maintained, e.g., 10% below or 1 sigma, if a distribution of write rates is available. There may also be levels of LL like LL1, LL2, LL3, each of which decrements by 1, 2 or 3, for example, depending on the tier of the threshold.

Each drive will have a particular life it is trying to achieve (like 5 years), and then depending on many design criteria like type of flash used, the write amplification, how much over provisioning, etc., one may determine the average write throughput to sustain this required lifetime. As an example, LH may be set 10% above this throughput and LL may be set 10% below. The throughput may be measured at the flash, not as delivered by the host. Only write throughput is important. Read throughput does not affect any of the thresholds or algorithms described.

L: desired maximum average throughput.

T: time register. This variable keeps track of the net time above or below the thresholds (LH, LL) set so that the mechanism can set or remove throttling.

TH: high throttle threshold. This is the high threshold for setting throttling. If T exceeds TH, the mechanism sets throttling.

TL: low throttle threshold. This is the low threshold for removing throttling. If T falls to or below TL, the mechanism removes throttling. TL may be equal to TH, zero, or the initial value of T, or may involve some hysteresis to ensure that the average is closely followed.

Throttling can be done by allowing only so many operations in any given time and only processing new ones as old ones complete. The throttling should be a light throttle so as to minimize system performance. In order to assure an overall L average throughput the system may have to apply the throttle for longer periods of time which is desirable. In this way, natural reductions in throughput will not result in throttling because the throughput is staying under T naturally. Such throttles as applying delay to all input ops would affect performance even if it naturally dropped.

P: periodic interval. This is the period of time for checking the average throughput.

Turning to FIG. 4, operation begins, and the mechanism initializes T and starts a timer (block 402). In one embodiment, the mechanism may initialize T to zero; however, alternatively, the mechanism may set T to another value depending on the implementation. The value of the register T may become negative or positive. The mechanism may keep the register T in non-volatile memory. The timer may increment by one every unit of time, such as every second.

The mechanism examines the timer and determines whether a period P expires (block 404). The mechanism may set the value of P to a value representing some unit of time. For example, if the timer increments every second, then the value of P may be set to a predetermined number of seconds. As long as P is small—say 5 minutes—and power cycles rare, it is acceptable if some time periods are not included in the statistics. If the mechanism determines that P time does not expire, operation returns to block 404 until P time expires. If the mechanism determines that P time expires in block 404, the mechanism determines the average write throughput for the period P by taking the MB written and dividing by the number of seconds in P (block 406).

By determining average write throughput in this manner, the mechanism allows short bursts of high write throughput. As long as these bursts are relatively short and are offset by low write throughput within the period P, the average write throughput will not cause the mechanism to set throttling for the solid-state storage device. Since many applications have some variability in their throughput, such a design will have minimum impact on the system.

The mechanism determines whether the average write throughput is greater than a high throughput threshold LH (block 408). If the average write throughput is not greater than LH, the mechanism determines whether the average write throughput is less than a low throughput threshold LL (block 410). If the average write throughput is not greater than LH and not less than LL, no change occurs and the solid-state storage device operates in a default manner. Thereafter, operation returns to block 404 to determine if another time period P expires.

If the average write throughput is greater than LH in block 408, the mechanism increments T (block 412). The mechanism then determines whether T is greater than a high throttle threshold TH (block 414). If the mechanism determines that T is greater than TH, the mechanism applies throttling to the write throughput of the solid-state storage device (block 416); otherwise, the solid-state storage continues to operate in a default manner. The mechanism may set throttling at L such that the solid-state storage device will simply not be able to go above that throughput. Thereafter, operation returns to block 404 to determine if another time period P expires.

If the average write throughput is less than LL in block 410, the mechanism decrements T (block 418). The mechanism then determines whether T is less than or equal to a low throttle threshold TL (block 420). If the mechanism determines that T is less than or equal to TL, the mechanism removes throttling from the write throughput of the solid-state storage device (block 422); otherwise, the solid-state storage continues to operate in its current state, which may be with or without throttling applied. Thereafter, operation returns to block 404 to determine if another time period P expires.

In one example embodiment, the mechanism may increment T in block 412 and decrement T in block 418 by P such that the value of T represents the amount of time the write throughput is considered high. One may set the values of LH and LL such that T represents the amount of time the average write throughput is above L, for example. In another example embodiment, the mechanism may increment T in block 412 and decrement T in block 418 by 1 (one) such that T represents a number of periods the write throughput is considered high.

One may set the values of LH, LL, T, TH, and/or TL to control the average write throughput depending on the implementation. For example, one may set the values such that the overall average write throughput closely follows the desired maximum average throughput for optimal performance. Alternatively, one may set the values such that the overall average write throughput stays relatively low to extend the lifecycle of the solid-state storage device. In one example embodiment, the mechanism may dynamically adjust the values of LH, LL, T, TH, and/or TL to achieve the least amount of throttling while still keeping the overall average write throughput below a desired maximum average. In another example embodiment, one may set the values based on service level agreements to achieve specific overall average write throughput on a customer-by-customer basis or for different times of day, for example.

In one example embodiment, one may set P to a high value, e.g., 12 hours, and then monitor the throughput. If the average write throughput for each 12-hour period, for example, is above LH, then the mechanism applies the throttle. In this example, the mechanism may monitor the throughput every 12 hours until the average is below L and then remove the throttle. After another 12 hours, the mechanism may monitor throughput again and set the throttle if the average throughput again exceeds LH. For this example, LH may be set at 10% above L because the mechanism must apply the throttle for much greater periods of time. This example is more forgiving with burstiness, but more severe with throttling.

In another example embodiment, the mechanism may employ hysteresis to dynamically adjust thresholds based on actual throughput. For instance, if the mechanism determines the average throughput is below the low threshold for a period of time, the mechanism may allow higher or longer bursts of throughput and maintain the same life of the solid-state device. Thus, responsive to determining the average throughput is below the low threshold, LL, for a predetermined number of periods, the mechanism may increase the high throughput threshold, LH, or high throttle threshold, TH.

If the mechanism determines the solid-state drive experiences a high amount of throttling due to average throughput being greater than the high throughput threshold for period of time, the mechanism may prompt a user to select whether to decrease device lifetime to reduce throttling. Responsive to the user selecting to sacrifice device lifetime for performance, the mechanism may increase the thresholds.

In another example embodiment, a user may define throttling settings in a policy. For example, a user may indicate a desired life of the solid-state drive, and the mechanism may calculate the thresholds based on the device lifetime set in the policy. As another example, a user may define a throttling level to conserve energy. The mechanism may then calculate the thresholds based on the user-defined throttling level. As a further example, a user may define a performance level, and the mechanism may calculate the thresholds based on the user-defined performance level.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide a mechanism for enabling throttling on average write throughput instead of peak write throughput for solid-state storage devices. The mechanism assures an average write throughput within a range but allows excursions of high throughput with periods of low throughput offsetting against those of heavy usage. The mechanism periodically determines average throughput and determine whether average throughput exceeds a high throughput threshold for a certain amount of time without being offset by periods of low throughput.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device, causes the computing device to:
    for each given period of time, determine average write throughput to a solid-state storage device over the given period of time;
    determine a first amount of time that average write throughput is high, wherein determining the first amount of time that average write throughput is high comprises incrementing a time register for each period of time average write throughput to the solid-state storage device over the given period of time is greater than a high throughput threshold;
    determine a second amount of time that average write throughput is low, wherein determining the second amount of time that average write throughput is low comprises decrementing the time register for each period of time average write throughput to the solid-state storage device over the given period of time is less than a low throughput threshold; and
    throttle write throughput to the solid-state storage device based on a comparison of the first amount of time and the second amount of time using the timer register.

2. The computer program product of claim 1, wherein incrementing the time register comprises incrementing the time register by the given period of time.

3. The computer program product of claim 1, wherein decrementing the time register comprises decrementing the time register by the given period of time.

4. The computer program product of claim 1, wherein throttling write throughput to the solid-state storage device based on the comparison of the first amount of time and the second amount of time comprises:
    responsive to the time register exceeding a high throttle threshold, setting throttling on write throughput to the solid-state storage device.

5. The computer program product of claim 4, wherein throttling write throughput to the solid-state storage device based on the comparison of the first amount of time and the second amount of time further comprises:
    responsive to the time register falling below a low throttle threshold, removing throttling on write throughput to the solid-state storage device.

6. The computer program product of claim 5, wherein the computer readable program further causes the computing device to:
    determine the low throughput threshold, the high throughput threshold, the low throttle threshold, and the high throttle threshold based on a user configurable policy.

7. The computer program product of claim 6, wherein the user configurable policy defines one of a user-defined device lifetime, a user-defined performance level, or a user-defined throttle level.

8. The computer program product of claim 4, wherein the computer readable program further causes the computing device to:
    responsive to determining the average write throughput is low for a predetermined amount of time, dynamically adjust the high throughput threshold or the high throttle threshold.

9. The computer program product of claim 1, wherein determining average write throughput to a solid-state storage device over the given period of time comprises determining a rate at which data is written to flash devices within the solid-state storage device.

10. The computer program product of claim 1, wherein determining average write throughput to a solid-state storage device over the given period of time comprises dividing an amount of data and metadata written to solid-state memory of the solid-state storage device by the given period of time.

11. The computer program product of claim 1, wherein the computer readable program is stored in a computer readable storage medium in a data processing system and wherein the computer readable program was downloaded over a network from a remote data processing system.

12. The computer program product of claim 1, wherein the computer readable program is stored in a computer readable storage medium in a server data processing system and wherein the computer readable program is downloaded over a network to a remote data processing system for use in a computer readable storage medium with the remote system.

13. A solid-state storage device, comprising:
    a controller; and
    a solid-state memory coupled to the controller, wherein the controller is configured to:
        for each given period of time, determine average write throughput to the solid-state memory over the given period of time;
        determine a first amount of time that average write throughput is high, wherein determining the first amount of time that average write throughput is high comprises incrementing a time register for each period of time average write throughput to the solid-state storage device over the given period of time is greater than a high throughput threshold;
        determine a second amount of time that average write throughput is low, wherein determining the second amount of time that average write throughput is low comprises decrementing the time register for each period of time average write throughput to the solid-state storage device over the given period of time is less than a low throughput threshold; and
        throttle write throughput to the solid-state memory based on a comparison of the first amount of time and the second amount of time using the time register.

14. The solid-state storage device of claim 13, wherein throttling write throughput to the solid-state storage device based on the comparison of the first amount of time and the second amount of time comprises:

responsive to the time register exceeding a high throttle threshold, setting throttling on write throughput to the solid-state storage device.

15. The solid-state storage device of claim 14, wherein throttling write throughput to the solid-state storage device based on the comparison of the first amount of time and the second amount of time further comprises:

responsive to the time register falling below a low throttle threshold, removing throttling on write throughput to the solid-state storage device.

16. The solid-state storage device of claim 15, wherein the controller is further configured to:

determine the low throughput threshold, the high throughput threshold, the low throttle threshold, and the high throttle threshold based on a user configurable policy.

17. The solid-state storage device of claim 16, wherein the user configurable policy defines one of a user-defined device lifetime, a user-defined performance level, or a user-defined throttle level.

18. The solid-state storage device of claim 14, wherein the controller is further configured to:

responsive to determining the average write throughput is low for a predetermined amount of time, dynamically adjust the high throughput threshold or the high throttle threshold.

19. The solid-state storage device of claim 13, wherein determining average write throughput to a solid-state storage device over the given period of time comprises determining a rate at which data is written to flash devices within the solid-state storage device.

20. The solid-state storage device of claim 13, wherein determining average write throughput to a solid-state storage device over the given period of time comprises dividing an amount of data and metadata written to solid-state memory of the solid-state storage device by the given period of time.

21. The solid-state storage device of claim 13, wherein incrementing the time register comprises incrementing the time register by the given period of time.

22. The solid-state storage device of claim 13, wherein decrementing the time register comprises decrementing the time register by the given period of time.

* * * * *